US010044307B2

(12) United States Patent
Lundin et al.

(10) Patent No.: US 10,044,307 B2
(45) Date of Patent: Aug. 7, 2018

(54) ARRANGEMENT AND METHOD FOR FORCE COMPENSATION IN ELECTRICAL MACHINES

(71) Applicant: MAGSTRÖM AB, Uppsala (SE)

(72) Inventors: Urban Lundin, Uppsala (SE); J Jose Perez-Loya, Uppsala (SE); Johan Abrahamsson, Uppsala (SE)

(73) Assignee: MAGSTRÖM AB, Uppsala (SE)

( * ) Notice: Subject to any disclaimer, the term of this patent is extended or adjusted under 35 U.S.C. 154(b) by 0 days.

(21) Appl. No.: 15/527,240

(22) PCT Filed: Nov. 13, 2015

(86) PCT No.: PCT/SE2015/051212
§ 371 (c)(1),
(2) Date: May 16, 2017

(87) PCT Pub. No.: WO2016/080889
PCT Pub. Date: May 26, 2016

(65) Prior Publication Data
US 2017/0338717 A1    Nov. 23, 2017

(30) Foreign Application Priority Data

Nov. 17, 2014  (SE) ...................................... 1451374

(51) Int. Cl.
*H02P 1/24* (2006.01)
*H02P 21/06* (2016.01)
*H02K 3/28* (2006.01)

(52) U.S. Cl.
CPC .............. *H02P 21/06* (2013.01); *H02K 3/28* (2013.01)

(58) Field of Classification Search
CPC . H02P 23/00; H02P 1/24; B02C 18/24; B02C 18/16; B02C 17/24; H02K 7/01
(Continued)

(56) References Cited

U.S. PATENT DOCUMENTS 3,970,907 A * 7/1976 Meyers .................... B02C 18/24
                                                          318/114
5,053,662 A * 10/1991 Richter .................... F01D 25/04
                                                          290/40 A
(Continued)

FOREIGN PATENT DOCUMENTS

DE          44 47 574 B4     8/1995
DE     10 2006 021498 A1    11/2007
(Continued)

OTHER PUBLICATIONS

A. Laiho et al., "Attenuation of Harmonic Rotor Vibration in a Cage Rotor Induction Machine by a Self-Bearing Force Actuator", IEEE Transactions on Magnetics, vol. 45, No. 12, pp. 5388-5398 (Dec. 2009).

(Continued)

*Primary Examiner* — Rina Duda
(74) *Attorney, Agent, or Firm* — Porter Wright Morris & Arthur LLP

(57) ABSTRACT

An electrical machine (1) comprises a rotor (20), a stator (10), a rotor power supply (50), at least one sensor (70) and a rotor magnetization control arrangement (60). The rotor has rotor windings (22) for controlling magnetization of rotor magnetic poles (24). The sensor is arranged to measure a parameter associated with a relative force between the stator and the rotor. The rotor magnetization control arrangement is communicationally connected to the sensor for receiving a signal representing the measured parameter. The rotor magnetic poles are divided into at least two groups (23). The rotor magnetization control arrangement is arranged for controlling the magnetization of the groups individually by providing a respective individually controllable rotor current. The rotor magnetization control arrangement is arranged to individually control the rotor currents in (Continued)

dependence of the signal representing the measured parameter. A method for controlling such an electrical machine is also disclosed.

20 Claims, 12 Drawing Sheets

(58) Field of Classification Search
USPC .................................................. 318/727, 432
See application file for complete search history.

(56) References Cited

U.S. PATENT DOCUMENTS

| | | | |
|---|---|---|---|
| 7,448,563 B2* | 11/2008 | Berger | .................... B02C 18/16 |
| | | | 241/30 |
| 2014/0184174 A1 | 7/2014 | Diedrichs | |
| 2015/0108938 A1 | 4/2015 | Laing et al. | |

FOREIGN PATENT DOCUMENTS

| WO | 03/032470 A1 | 4/2003 |
|---|---|---|
| WO | 2013/037908 A1 | 3/2013 |

OTHER PUBLICATIONS

Extended European Search Report dated Jun. 15, 2018, from the corresponding European application No. 15860695.4.

* cited by examiner

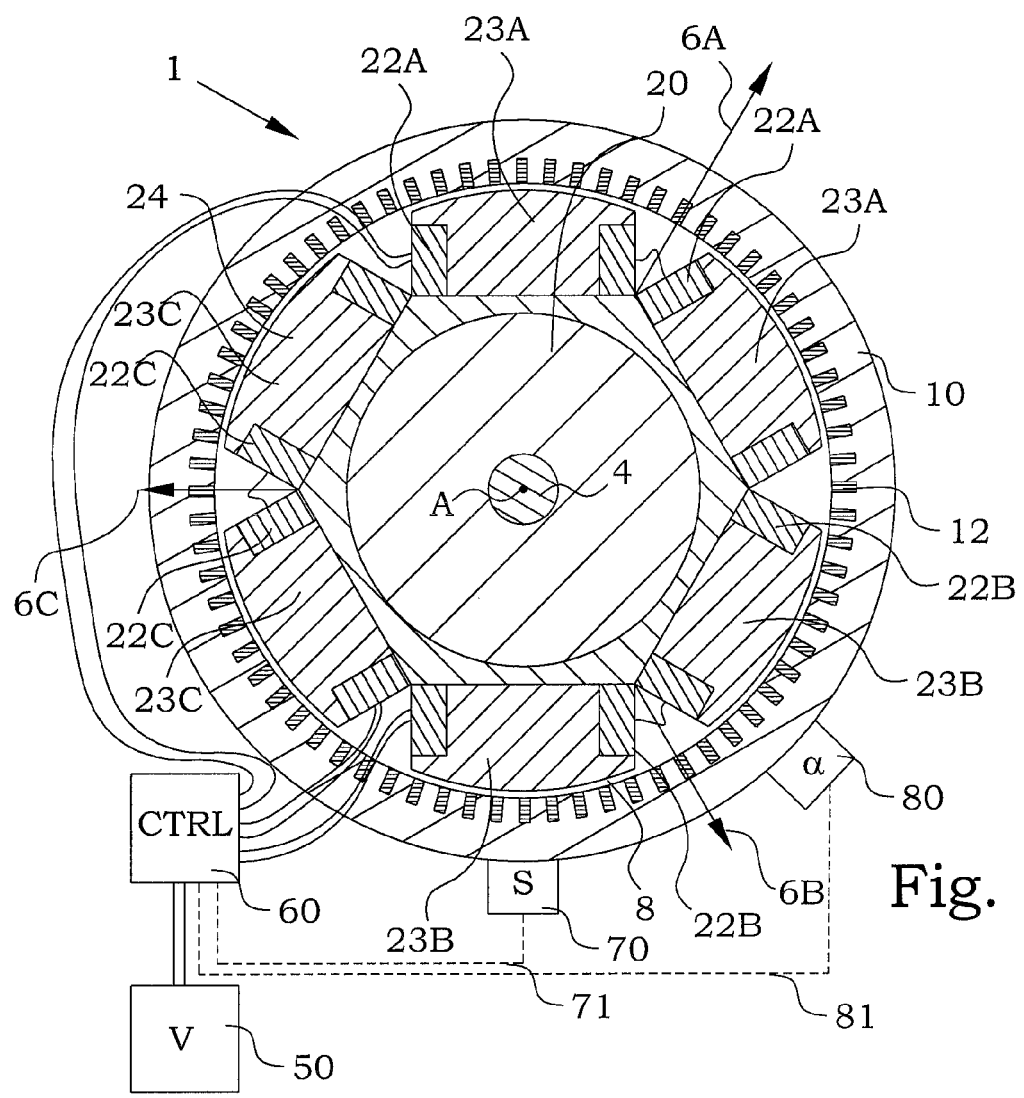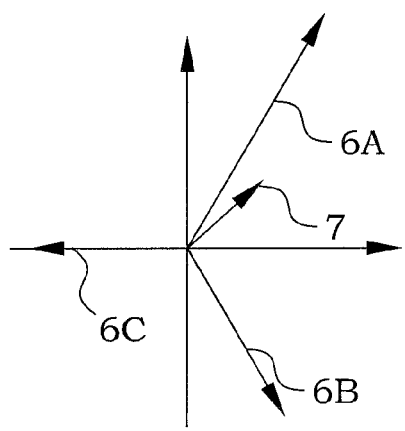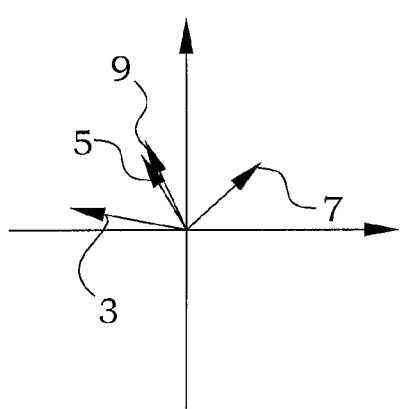
Fig. 2A
Fig. 2B
Fig. 2C

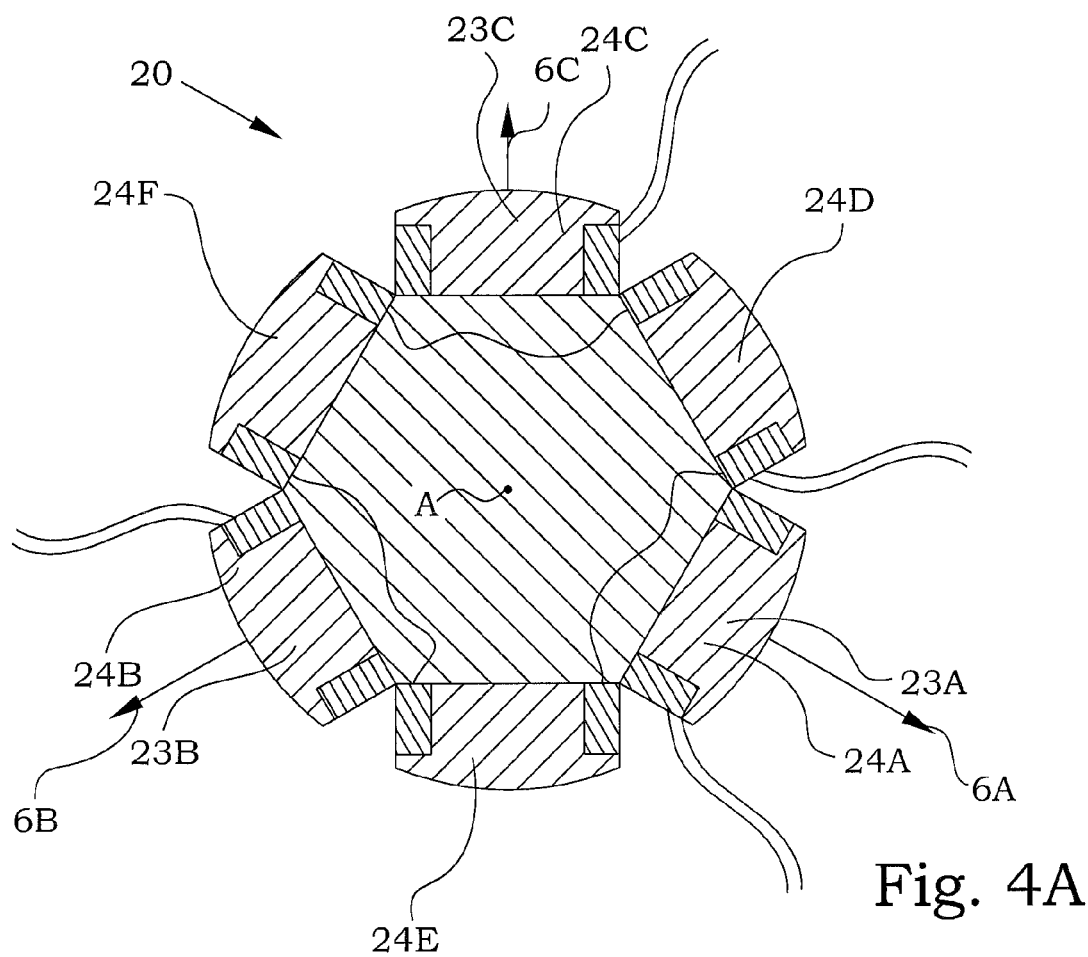
Fig. 4A
Fig. 4B
Fig. 4C

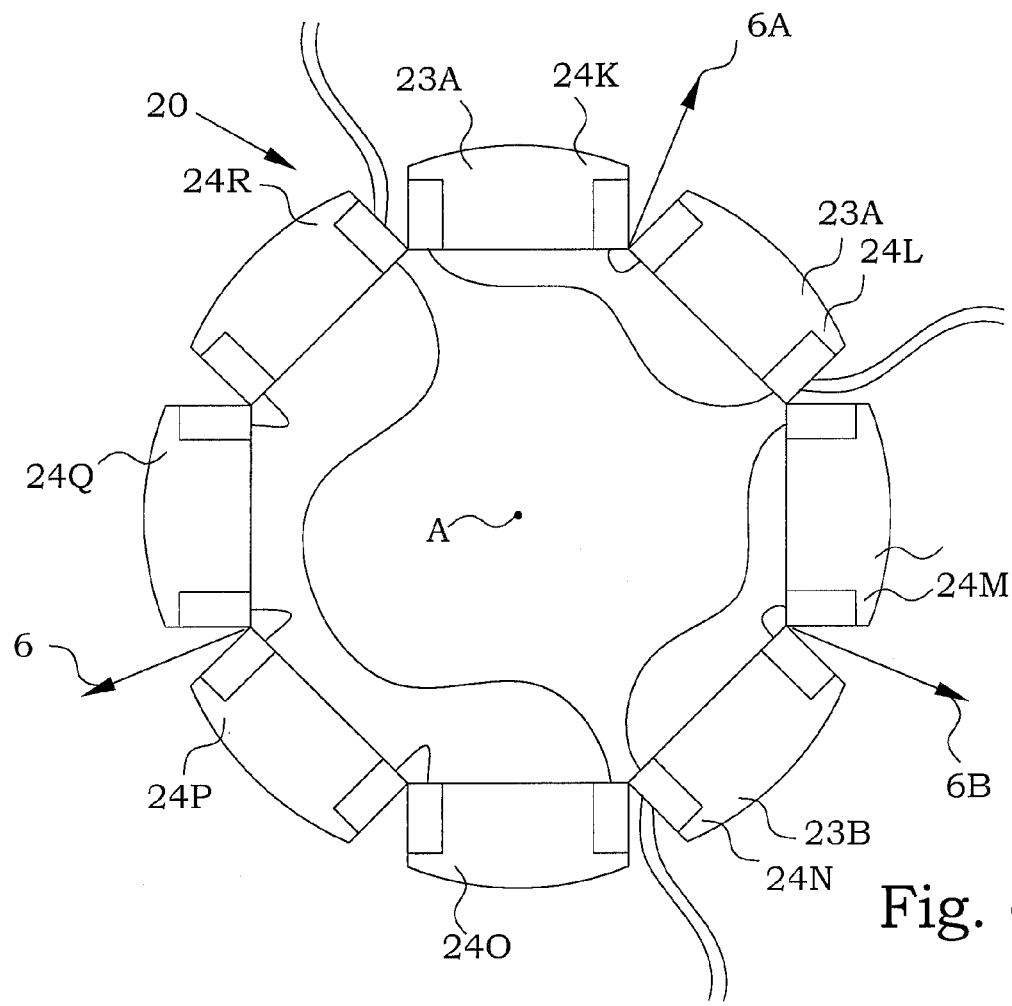
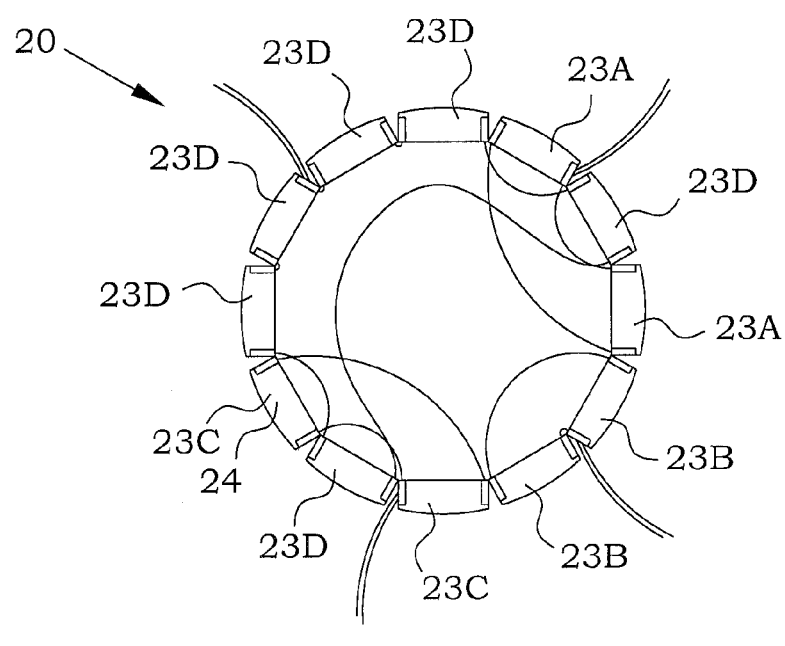
Fig. 4F
Fig. 4G

ARRANGEMENT AND METHOD FOR FORCE COMPENSATION IN ELECTRICAL MACHINES

TECHNICAL FIELD

The present technical disclosure relates in general to devices and methods relating to electrical machines, and in particular to electrical machines having active compensation of radial forces and methods therefore.

BACKGROUND

In rotating machines, in general, different forces are acting between rotor and stator. Some of the forces are due to loads or force applications on the rotating shaft. Such forces are typically mechanical forces. Other forces, e.g. magnetic forces, may appear as a result of non-perfect rotor and/or stator configurations. Such forces are typically carried by different kinds of bearings. Rotating machines typically have both radial and axial bearings, of which either or both may be of a contact free type.

Some rotating electrical machines according to prior art utilizes a principle based on that a control flux is added onto the normal bias stator flux in a stator. There is an additional stator winding that enables the provision of different fluxes to different parts of the stator. The difference in stator current at different positions, in a circumferential direction, means that the airgap flux density varies along the airgap. The varying airgap flux density gives rise to a varying force between the rotor and the stator.

One example of a machine utilizing stator control windings to attenuate flexural rotor vibrations is disclosed in "Attenuation of Harmonic Rotor Vibration in a Cage Rotor Induction Machine by a Self-Bearing Force Actuator" by A. Laiho et al, in IEEE Transactions on magnetics, vol. 45, No. 12, December 2009, pp. 5388-5398. In the published International Patent Application WO 03/032470 A1, an electrical machine having capability to generate lateral forces is presented. The stator currents are distributed between different parts of the stator windings in different magnitudes, which gives rise to a resulting force between the rotor and the stator.

In the U.S. Pat. No. 5,053,662, electromagnetic damping of a shaft is disclosed. Input signals from a position sensor indicates that damping of a shaft of an electrical machine, with a permanent magnet or switched reluctance rotor, is desired. Stator windings, electromagnetically coupled with the rotor, are caused to be selectively energized to dampen the vibrations of the shaft, in response to the sensor indication.

A problem with such prior-art solutions is that the machine design has to be modified to comprise the additional stator control windings, which influences the performance of the entire machine. Furthermore, in large machines, the stator power that is necessary to control for achieving suitable forces is high, which requires complex and expensive power electronics.

SUMMARY

A general object of the present disclosure is to provide solutions for compensating radial forces that are easy to provide as retrofits on existing machines as well as being easy to implement in new designs and which requires less complex power electronics than used in prior art.

The above object is achieved by methods and devices according to the independent claims. Preferred embodiments are defined in dependent claims.

In general words, in a first aspect, an electrical machine comprises a rotor, a stator, a rotor power supply, at least one sensor and a rotor magnetization control arrangement. The rotor has rotor windings for controlling magnetization of rotor magnetic poles. The stator is provided around the rotor and arranged for allowing the rotor to rotate relative the stator. The rotor power supply is arranged to supply the rotor windings with current. The sensor(s) is(are) arranged to measure a parameter associated with a relative force between a part of the stator or a part mechanically attached to the stator and a part of the rotor or a part mechanically attached to the rotor. The rotor magnetization control arrangement is communicationally connected to the at least one sensor for receiving a signal representing the measured parameter. The rotor magnetic poles are divided into at least two groups of rotor magnetic poles, wherein each group of rotor magnetic poles has at least one magnetic pole. The rotor magnetization control arrangement is arranged for controlling the magnetization of the at least two groups of rotor magnetic poles individually by providing a respective individually controllable rotor current from the rotor power supply to the rotor windings of each of the at least two groups of rotor magnetic poles. The rotor magnetization control arrangement is arranged to individually control the respective rotor currents in dependence of the signal representing the measured parameter of the at least one sensor.

In a second aspect, a method for controlling an electrical machine is considered. The electrical machine in question has a stator and a rotor with rotor windings comprising rotor windings for controlling magnetization of rotor magnetic poles. The rotor magnetic poles are divided into at least two groups of rotor magnetic poles, wherein each group of rotor magnetic poles has at least one rotor magnetic pole. The method comprises measuring of a parameter associated with a relative force between a part of the stator or a part mechanically attached to the stator and a part of the rotor or a part mechanically attached to the rotor. A respective individually controllable rotor current is supplied to the rotor windings of each of the at least two groups of rotor magnetic poles for controlling respective magnetic forces between the at least two groups of rotor magnetic poles and the stator. The respective rotor currents are controlled individually in dependence of the measured parameter.

One advantage with the proposed technology is that by controlling rotor magnetic pole magnetization by controlling the current used to excite the rotor, force compensation can be achieved by relatively low currents. Thereby, less complex power electronics than in prior art may be used. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 2A is a schematic cross-sectional view of an embodiment of an electrical machine with groups of rotor magnetic poles;

FIG. 2B is a diagram illustrating radial magnetic forces between rotor magnetic poles and stator in the electrical machine of FIG. 2A;

FIG. 2C is a diagram illustrating radial force compensation in the electrical machine of FIG. 2A;

FIG. 4A is a schematic view of an embodiment of a rotor;

FIG. 4B is a schematic view of a star connection of rotor windings;

FIG. 4C is a schematic view of a delta connection of rotor windings;

FIGS. 4F-4G are schematic views of yet other embodiments of a rotor;

DETAILED DESCRIPTION

Throughout the drawings, the same reference numbers are used for similar or corresponding elements.

For a better understanding of the proposed technology, it may be useful to begin with a brief overview of a typical electric machine utilizing electrically excited rotor poles.

Figures 1A, 1B:
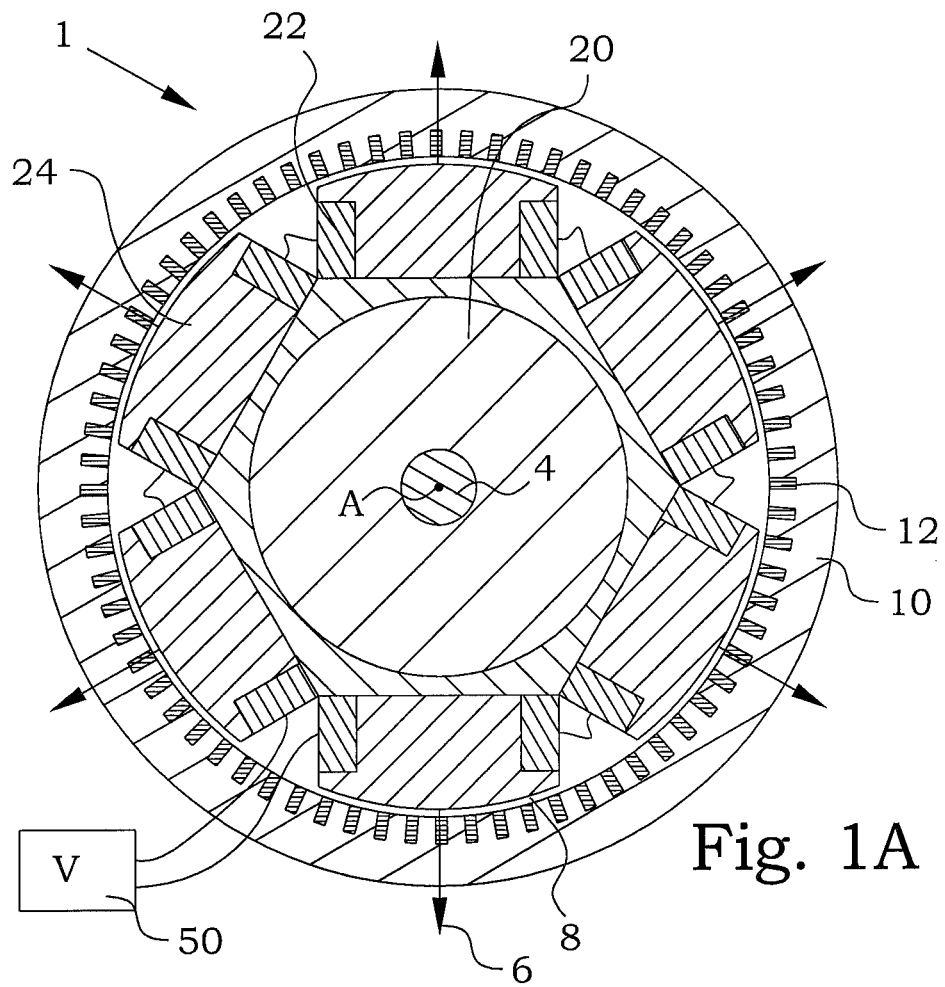
FIG. 1A is a schematic cross-sectional view of an electrical machine.
FIG. 1B is a diagram illustrating radial magnetic forces between rotor magnetic poles and stator in the electrical machine of FIG. 1A in an ideal situation.

FIG. 1A illustrates a cross-sectional view of an electric machine 1 utilizing rotor magnetic poles 24 that are electromagnetically excited. The electric machine 1 comprises a stator 10 with stator windings 12. A rotor 20 is provided on a shaft 4 and is rotatable relative the stator 10 around a rotational axis A. An airgap 8 is present between the rotor 20 and the stator 10. The term "airgap" is used here even in cases where the gap actually may be filled with other substances than air or may be provided by a vacuum. The rotor 20 of this example has 6 rotor magnetic poles 24. The poles are magnetized by sending a rotor current through rotor windings 22 wound around the rotor magnetic poles 24. A rotor power supply 50 is therefore arranged to supply the rotor windings 22 with current. The magnetization current around the rotor magnetic poles 24 gives rise to a magnetic field which interacts over the airgap 8 with the stator 10. The interaction gives rise to a force between each rotor magnetic pole 24 and the stator 10.

FIG. 1B illustrates schematically the forces on the six rotor magnetic poles from the stator of the machine illustrated in FIG. 1A. If one assumes that the rotor is perfectly centered within the stator and both the rotor and stator have ideal magnetic poles and windings, the force on each rotor magnetic pole has the same magnitude, however, directed in six different directions separated by 60 degrees. The resulting net force between the rotor and stator in such a case will be zero, since the six forces cancel each other.

In the real world, however, an electrical machine is not perfect in all details. Therefore, in a typical case, the different forces will not cancel each other perfectly, but will give rise to a resulting net force. If the resulting net force is a result of imperfections only at the rotating parts of the electrical machine, the resulting net force will rotate with the same rotational speed as the rotor. If the resulting net force is a result of imperfections only at the stationary parts of the electrical machine, the resulting net force will be stationary. In a typical practical case, the resulting net force will be a combination of a rotating part and a stationary part. Furthermore, there might also be components, e.g. external forces as discussed further below, that have other time variation patterns.

In most applications, a resulting net force between the rotating and stationary parts gives rise to increased wear at the bearings, if mechanical bearings are used, and typically also to vibrations of different frequencies and magnitude. In such applications, one strives to minimize the resulting net force by trying to make the rotor and stator as perfect as possible.

Radial forces between the stator and rotor may also be induced by other parts connected to the same shaft as the rotor, such as e.g. turbines or any driven parts.

In certain applications, it might be of interest to deliberately have a resulting net force that is not equal to zero. Examples of such applications may be when operating a machine with a vertical shaft, and in particular during start and stop since during start and stop, without magnetization, the bearings are normally unloaded and the shaft is free to move within the mechanical tolerances. In such applications, there is consequently a strive to make the resulting net force between the rotor and stator to be as close to a predetermined non-zero force as possible.

There are different approaches to compensate for unwanted forces between stator and rotor. In the references mentioned in the background section, different techniques are used for achieving a non-symmetrical stator magnetic field and in such a way achieve a non-zero net magnetic force between the rotor and stator. Such approaches may operate well, but requests typically extensive redesign and/or the need of complex and relatively high power electronics.

According to the technologies presented in the present disclosure, the control efforts are instead directed towards the rotating parts.

FIG. 2A illustrates a schematic drawing in a cross-sectional view of an embodiment of an electrical machine 1. The electrical machine 1 has a rotor 20, which in turn comprises rotor windings 22A, 22B and 22C for controlling magnetization of rotor magnetic poles 24. The electrical machine 1 has further a stator 10, provided around the rotor 20 and arranged for allowing the rotor 20 to rotate relative the stator 10 around an axis A. In this embodiment, the rotor magnetic poles 24 are divided into three groups 23A, 23B, 23C of rotor magnetic poles 24, each group 23A, 23B, 23C of rotor magnetic poles having at least one rotor magnetic pole 24. A rotor power supply 50 is arranged to supply the rotor windings 22A, 22B and 22C with current, via a rotor magnetization control arrangement 60. The rotor magnetization control arrangement is arranged for controlling the magnetization of the three groups of rotor magnetic poles individually. This is achieved by providing a respective individually controllable rotor current from the rotor power supply 50 to the rotor windings 22 of each of three groups 23A, 23B, 23C of rotor magnetic poles 24.

The rotor current passing through the rotor winding 22A controls the magnetization of the rotor magnetic poles of group 23A. These rotor magnetic poles of group 23A create a magnetic force relative to the stator 10. The net force from the rotor magnetic poles of group 23A is illustrated as a group force 6A. The rotor current passing through the rotor winding 22B controls the magnetization of the rotor magnetic poles of group 23B. These rotor magnetic poles of group 23B create a magnetic force relative to the stator 10. The net force from the rotor magnetic poles of group 23B is illustrated as a group force 6B. The rotor current passing through the rotor winding 22C controls the magnetization of the rotor magnetic poles of group 23C. These rotor magnetic poles of group 23C create a magnetic force relative to the stator 10. The magnetic poles are wound to create a magnetic field with alternating north and south poles in a circumferential direction. The net force from the rotor magnetic poles of group 23C is illustrated as a group force 6C. Since the groups 23A, 23B and 23C are grouped without any rotational symmetry relative the axis A within each group, the group forces 6A, 6B, 6C becomes non-zero. However, in this embodiment there is a rotational symmetry relative the axis A between the different groups. In other words, group 23A is similar to group 23B, rotated 120° around axis A and group 23A is similar to group 23C, rotated 240° around axis A.

These group forces 6A, 6B and 6C are illustrated in a diagram in FIG. 2B. By sending different currents to the different groups, the group forces can be controlled to be different. The resultant magnetic force 7 thereby becomes different from zero.

If the force between the rotor 20 and the stator 10 caused by other interactions than through the above described rotor magnetic pole magnetization is known, the resultant magnetic force 7 can be used for controlling purposes. This is schematically illustrated in FIG. 2C. Forces caused by said other interactions is denoted by 3. A predetermined target force 5 is the goal of the control. The resultant magnetic force 7 can be controlled to give a resulting net force 9 that should be as close to the target force as possible. The target force 5 is in a typical case equal to zero, but as mentioned further above, there are applications where a non-zero predetermined target force 5 is requested. In an electrical machine having an eccentric rotor, magnetic forces are constantly acting on the rotor, and a target force can be designed to counteract such forces. Similarly, if a rotor field winding experiences an inter-turn short circuit, forces caused by this can be compensated.

In order to compensate for other forces acting on the rotor, such forces have to be known. To this end, at least one sensor 70 is provided, again with reference to FIG. 2A. This sensor 70 is arranged to measure a parameter associated with a relative force between the stator 10 and the rotor 20. Since parts being mechanically attached to the rotor or stator, respectively, experience force conditions that are proportional to the relative force between rotor and stator, such parts can also be used for the sensor. In other words, the sensor 70 is arranged between a part of the stator or a part mechanically attached to the stator on one hand and a part of the rotor or a part mechanically attached to the rotor on the other hand. The rotor magnetization control arrangement 60 is communicationally connected, illustrated by the dotted line 71, to the sensor or sensors 70 for receiving a signal representing the measured parameter. The rotor magnetization control arrangement 60 is arranged to individually control the respective rotor currents in dependence of the signal representing the measured parameter of the sensor 70 or sensors. The sensors will be discussed more in detail further below.

In a general case, the individual control of the rotor magnetization can be controlled to reach an acceptable resulting net force, e.g. within certain ranges, amplitudes, frequencies etc. In a preferred embodiment, the rotor magnetization control arrangement 60 may have a control functionality with a target. Since the magnetization of the rotor magnetic poles causes a respective magnetic force between the rotor magnetic poles and the stator which contribute to a resulting net force between the part of said stator or the part mechanically attached to the stator and the part of said rotor or the part mechanically attached to the rotor used for the sensor, a predetermined target force, larger than or equal to zero, can be identified. The rotor magnetization control arrangement 60 is thereby arranged for directing the resulting net force towards the predetermined target.

In one embodiment the predetermined target force is zero. In such a case, the rotor magnetization control arrangement is arranged to supply the respective rotor currents to give a magnetic force between the rotor magnetic poles and the stator that minimizes the resulting net force.

Since an electrical machine comprises both stationary and rotating parts, measuring and/or control can be performed in a rotating reference system or a stationary reference system. In the present technology, where magnetization control of the rotor magnetic poles is used, the control operation can be considered as taking place in the rotating reference system. This is independent of the actual physical position of the control system. If the sensor or sensors also are provided in the rotating reference system, e.g. mounted in attachment of the rotor, the measuring takes place in the same reference system as the control. Imperfections in the rotor may then show up as constant forces, while imperfections in the stator will show up as forces with a period essentially inverse to the rotating speed, or equal to a multiple or fraction of the inverse to the rotating speed. Such forces can be compensated by providing the rotor windings with suitable currents. If DC currents or time varying currents with a time constant larger than a revolution time of the rotor are used as the respective rotor currents, imperfections at the rotor and slowly varying external forces can be compensated. If time varying currents with a time constant equal or smaller than the revolution time of the rotor is used as the respective rotor currents, also imperfections at the stator and fast varying external forces can be compensated.

Since imperfections in the stator causes a force that is varying with the same frequency as the rotation, it is of benefit also to know the rotational speed.

Furthermore, if the sensors at least partly measures quantities with a reference point in the stationary reference system, such measurements will be time varying in the rotational system in which the control is performed. Furthermore, also the phase between the reference systems will be of importance. Therefore, in a preferred embodiment, the electrical machine further comprises a rotor angular position indicator 80. The rotor angular position indicator 80 is communicationally connected, as indicated by the dotted line 81, to the rotor current control arrangement 60. The rotor angular position indicator 80 is arranged for determining the present angular position of the rotor 20 with respect to the stator 10. The rotor magnetization control arrangement 60 is consequently further arranged for receiving a signal from the rotor angular position indicator 80 representing the present angular position. The rotor magnetization control arrangement 60 is further arranged for individually controlling the respective rotor currents in further dependence of the signal representing the present angular position.

Another possibility is to measure the force both in the rotor and in the stator. In this way it is not needed to know the rotational speed nor the position of the rotor.

Figure 3:
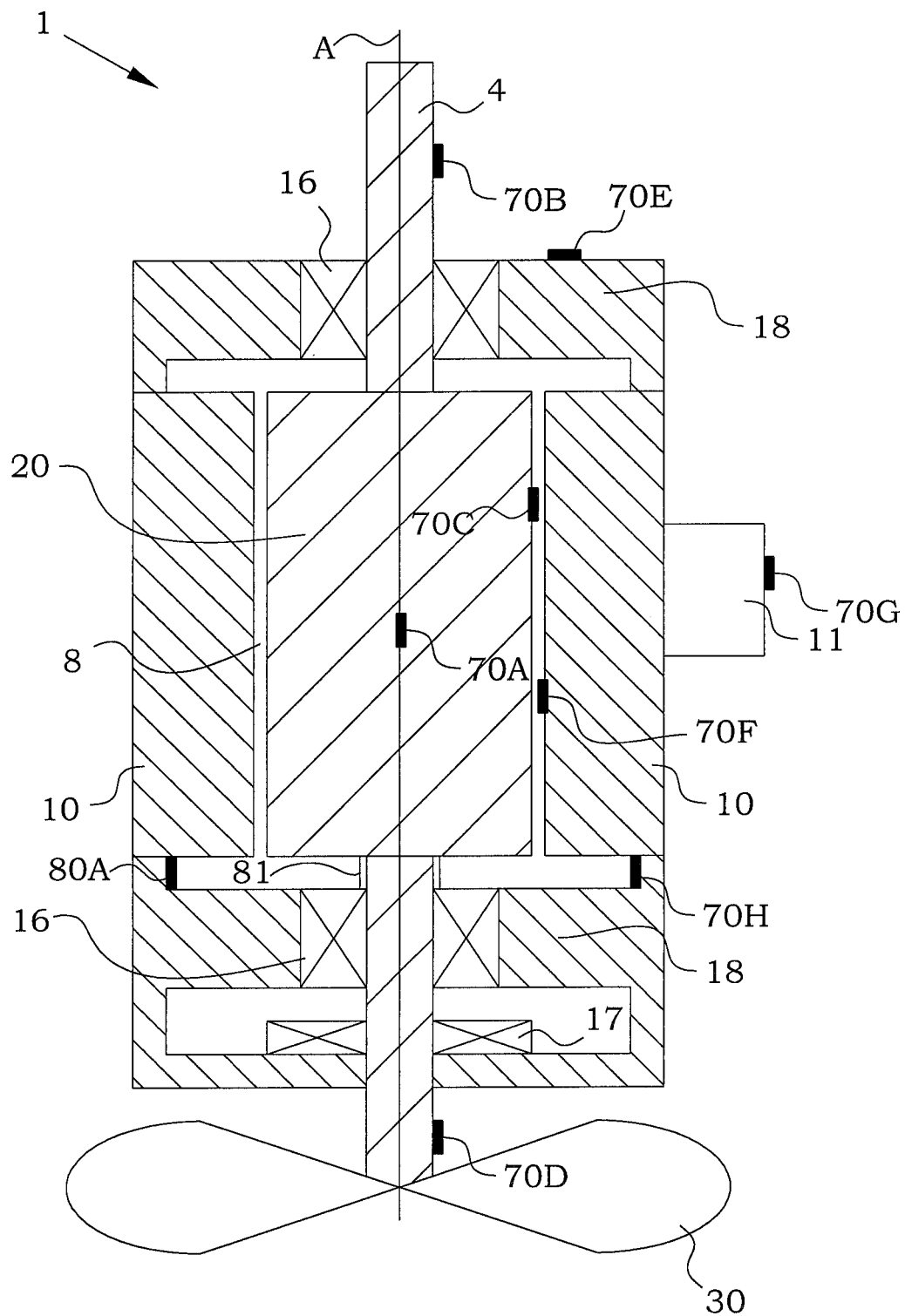
FIG. 3 is a schematic axial cross-sectional view of an embodiment of an electrical machine.

FIG. 3 illustrates schematically an embodiment of an electrical machine in an axial cross-sectional view. The shaft 4 is connected to an external rotating member 30. If the electrical machine 1 is a generator, the external rotating member 30 may be a turbine. If the electrical machine 1 is a motor, the external rotating member 30 may be a driven member, such as a wheel or propeller. The sensors used for achieving information about the forces acting on the electrical machine, and in particular the relative force between the stator and rotor, can be of very different types and may be positioned at very different positions. Preferably, more than one sensor is used, also for redundancy reasons.

One possible sensor to use is a strain gauge. Such a strain gauge can be attached to any part of the stator and/or rotor that may experience any deformation due to applied forces. In FIG. 3, sensor 70A is a strain gauge mounted at the rotor main body. Sensor 70B is a strain gauge mounted at the shaft rigidly mechanically attached to the rotor 20. Any deformation of these parts will result in a measurable strain. By considering the mechanical design of the rotor such a strain can be associated with a certain force between the rotor 20 and stator 10. Preferably that force can be estimated to magnitude and direction. Typically, more than one sensor is used, e.g. for detecting strains in different directions, and the association to a certain force may then be performed collectively for more than one sensor measurement.

Sensor 70C illustrates a magnetic flux sensor, here mounted at the rotor surface. The magnetic flux sensor measures the magnetic flux in the airgap 8 between the rotor 20 and the stator 10. Based on magnetic design of the rotor and stator, the magnetic flux can be associated with a certain force. Preferably, multiple magnetic flux sensors are used to pick up forces in different directions around the rotor 10.

Sensor 70D is a vibration gauge, e.g. of a piezoelectric type. The use of a vibration sensor is somewhat similar to a strain gauge, and by design considerations, the measurements from the vibration sensor may be associated with different forces acting between the stator 10 and rotor 20.

Sensors 70E is a strain gauge mounted close to the stator 10, in this case on a bearing bracket 18 holding a radial bearing 16. The operation is analogue to the rotor-mounted sensor, except for that the sensor 70E is placed in a stationary reference system, while sensors 70A and 70 B are provided in a rotated reference system. Sensor 70F is a magnetic flux sensor, here mounted at the stator surface, also measuring the magnetic flux in the airgap 8. Sensor 70G is a vibration gauge mounted at a member 11 rigidly attached at the stator 10. The vibrations of the stator 10 is transferred to the member 11 and the measured vibrations may therefore still be associated back to forces acting between the rotor 20 and the stator 10.

Sensor 70H is a relative position detector. In this embodiment, it is mounted at the stator 10 and measures the distance to the rotor shaft 4. Variations in this distance may be associated with forces between rotor and stator. The association may be difficult to obtain in a theoretical manner and calibration measurements may have to be performed in order to provide the association. Alternatively, additional measurements from other sensors can be used for achieving a reasonable determination of a force acting between rotor and stator.

Sensor 80A is a rotor angular position indicator. In this embodiment, by detecting the occurrence of markings 81 on the rotor shaft 4, the rotor angular position indicator may calculate a rotational speed as well as a momentary angular position. Other embodiments of rotor angular position indicators can be based on magnetic field measurements or stator voltage zero crossings. Also, as mentioned earlier, the angular position and rotational speed can also be deduced from measurements of the force on both the rotor and the stator. Many other possibilities to measure the rotor angular position, mechanical, electrical as well as magnetic, are well known to any person skilled in the art. The details themselves of how the angular position is obtained are of no essential importance for the present ideas to provide the intended technical effect as long as an angular position is provided.

The sensors 70A-H and 80A measure some parameters, e.g. strain, magnetic flux, vibration characteristics or distances. Such parameters may be coded and communicated by different types of signaling to the rotor magnetization control arrangement. The signal can e.g. be an electrical signal through a wired communicational connection, an electromagnetic signal transferred by any wireless communication method, a light signal through an optical fiber etc.

The detailed function of the different types of sensors is known by any person skilled in the respective art. Since such details are not of crucial importance to achieve the technical effect, they are not further discussed. The same is true for the communication of the signals having the coded representations of the parameters. Such methods and devices are well-known by persons skilled in the area of measurement techniques.

The grouping of rotor magnetic poles can be performed in many different ways. Depending on the actual grouping design, the magnetization control strategy has to be modified accordingly. A few non-limiting examples will be illustrated here below, just to emphasize the possibility for tremendous varying group designs.

In FIG. 4A, a schematic illustration of an embodiment of a rotor 20 of an electrical machine with six rotor magnetic poles 24A-F is shown. A first rotor winding is wound around rotor magnetic poles 24D-F. This rotor winding is supplied with a constant current, thereby giving a constant magnetization of the rotor magnetic poles 24D-F. The rotor magnetic poles 24D-F are therefore passive concerning the radial force control. Rotor magnetic poles 24A-C are magnetized by three separate windings, in which individually controllable currents are provided. They thereby constitute three groups 23A-C of one rotor magnetic pole each 24A-C.

In a basic embodiment illustrated by FIG. 4A, all groups 23A-C of rotor magnetic poles are supplied with current using two separate electrical connections for each group. However, it would also be possible to reduce the number of electrical connections by connecting the different windings in a star configuration, as indicated by FIG. 4B. In other words, the rotor magnetic poles being divided into three groups of rotor magnetic poles and respective rotor currents are provided to rotor windings corresponding to the three groups of rotor magnetic poles in a star connection. The common point may be grounded. However, such an electrical connection will put extra constraints on what currents can be used in the different groups, since the currents at each instant have to sum up to zero. Also a delta configuration, as indicated by FIG. 4C may be used. In other words, the rotor magnetic poles are divided into three groups of rotor magnetic poles and respective rotor currents are provided to rotor windings corresponding to the three groups of rotor magnetic poles in a delta circuit having no common ground. In such a case, the instant sum of the voltages provided over the groups has to be zero.

Figure 4D:
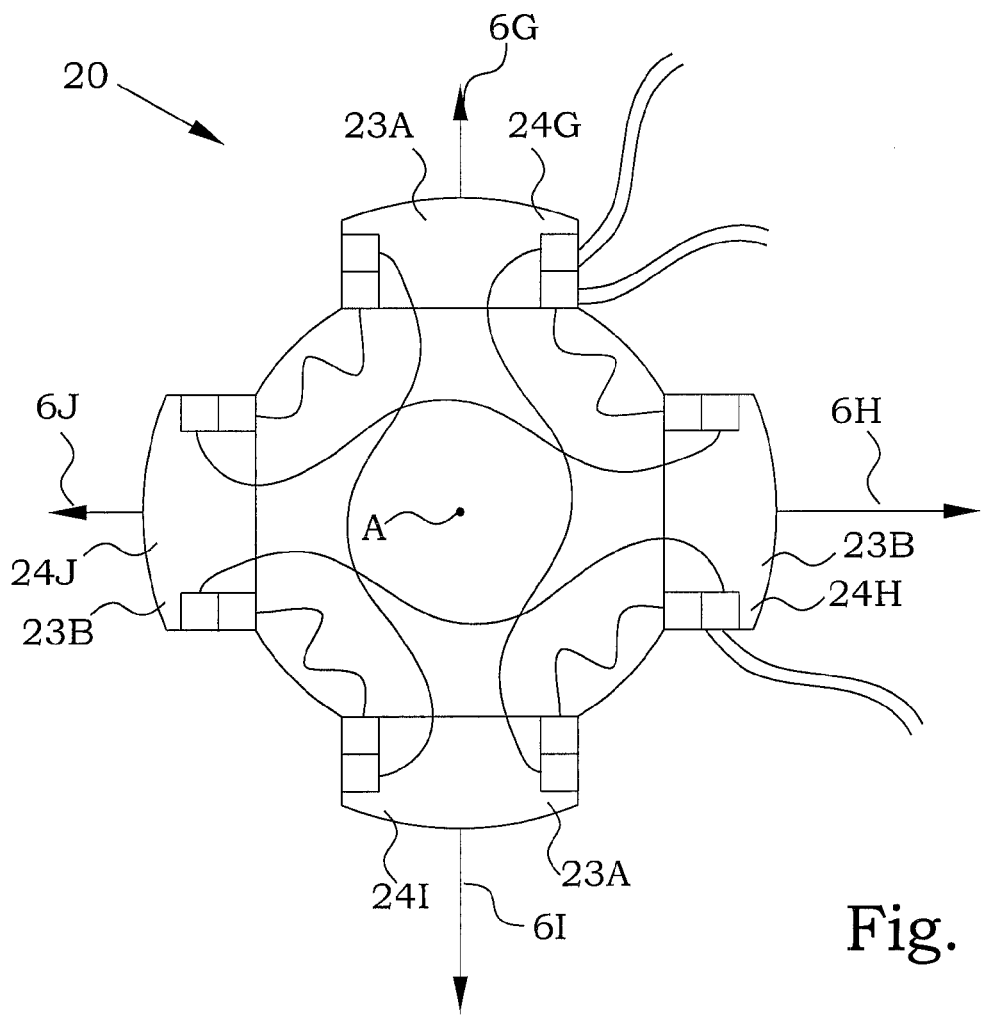
FIG. 4D is a schematic view of another embodiment of a rotor.
Figure 4E:
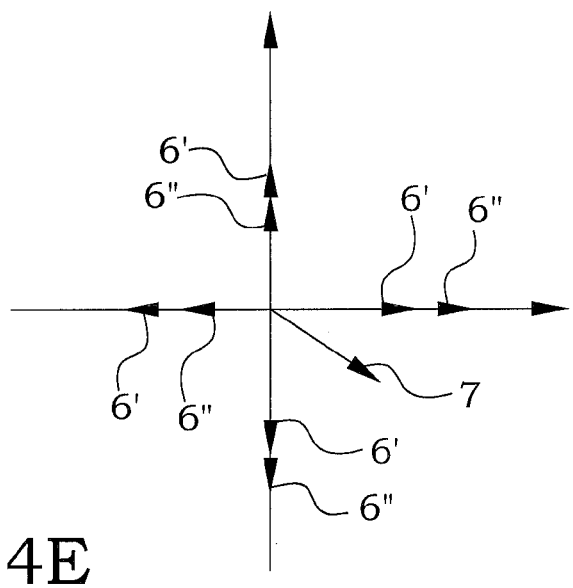
FIG. 4E is a diagram illustrating magnetic forces between rotor magnetic poles and stator for the rotor of FIG. 4D.

In FIG. 4D, an embodiment of a rotor 20 of an electrical machine with four rotor magnetic poles 24G-J is shown. All four rotor magnetic poles are magnetized with a basic magnetization by a common winding providing a constant current. This will ideally not give rise to any radial forces, but in reality there will be a non-controllable radial force due to imperfections in the machine. In addition, one additional rotor winding is provided to rotor magnetic poles 24G and 24I. In this rotor winding, a controllable current is supplied. The rotor magnetic poles 24G and 24I therefore constitutes a first group 23A of rotor magnetic windings. The additional rotor winding at the rotor magnetic pole 24G is wound in the same direction as the common rotor winding and the magnetization of rotor magnetic pole 24G becomes equal to the sum of the magnetizations caused by the common rotor current and the additional rotor current. The additional rotor winding at the rotor magnetic pole 24I is, however, wound in an opposite direction to the common rotor winding and the magnetization of rotor magnetic pole 24I thereby becomes equal to the difference of the magnetizations caused by the common rotor current and the additional rotor current. An increased current in the additional rotor winding will therefore increase the magnetization of rotor magnetic pole 24G but decrease the magnetization of rotor magnetic pole 24I by the same amount. A similar additional rotor winding is provided to rotor magnetic poles 24H and 24J. In this rotor winding, another controllable current is supplied. The rotor magnetic poles 24H and 24J therefore constitutes a second group 23B of rotor magnetic windings. In FIG. 4E, the forces are schematically illustrated. The arrows 6' denotes the magnetic forces that are present with only the common rotor winding, while the arrows 6" denotes an example of the magnetic forces when individual additional currents are provided to the groups 23A and 23B. A resulting net force 7 is thereby created.

In FIG. 4F, an embodiment of a rotor 20 of an electrical machine with eight rotor magnetic poles 24K-R is shown. A rotor winding is provided to magnetize all the rotor magnetic poles 24K-24R with a constant magnetization current, the bias rotor current. A separate rotor winding for an individually controllable rotor current is additionally provided to the rotor magnetic poles 24K and 24L, thereby creating a first group 23A. Another separate rotor winding for an individually controllable rotor current is also additionally provided to the rotor magnetic poles 24M and 24N, thereby creating a second group 23B. The rotor magnetic poles 24O-R are therefore "passive" in the sense that their magnetization is constant and cannot be used to actively compensate for other forces. However, together with the groups 23A and 23B of rotor magnetic poles that can have a controllable magnetization, a varying resulting net force can be obtained.

In an alternative embodiment, the bias magnetization could be provided by permanent magnets. Windings for controllable rotor currents may then be used for creating an additional magnetization superposed onto the effect of the permanent magnets. In other words, the rotor magnetization control arrangement is arranged for controlling the rotor currents, giving additional individual rotor magnetizations, superposed on a basic permanent magnet magnetization.

In FIG. 4G, an embodiment of a rotor 20 of an electrical machine with twelve rotor magnetic poles 24 is shown. Four separate rotor windings for individually controllable rotor currents are provided to the rotor magnetic poles 24, thereby creating four groups 23A-D. This embodiment illustrates the fact that any grouping of windings that generate at least two vectors that do not point in the same direction is capable of generating a net force on the rotor in any given direction, even though the vectors are not orthogonal.

Any person skilled in the art now realizes that the actual design can be varied in many configurations, having different number of groups, but at least two, where each group can have one or several rotor magnetic poles. In some embodiments, the rotor magnetic poles are divided into more than two groups. There might also be rotor magnetic poles that are not involved in any of the groups.

Figure 5A:
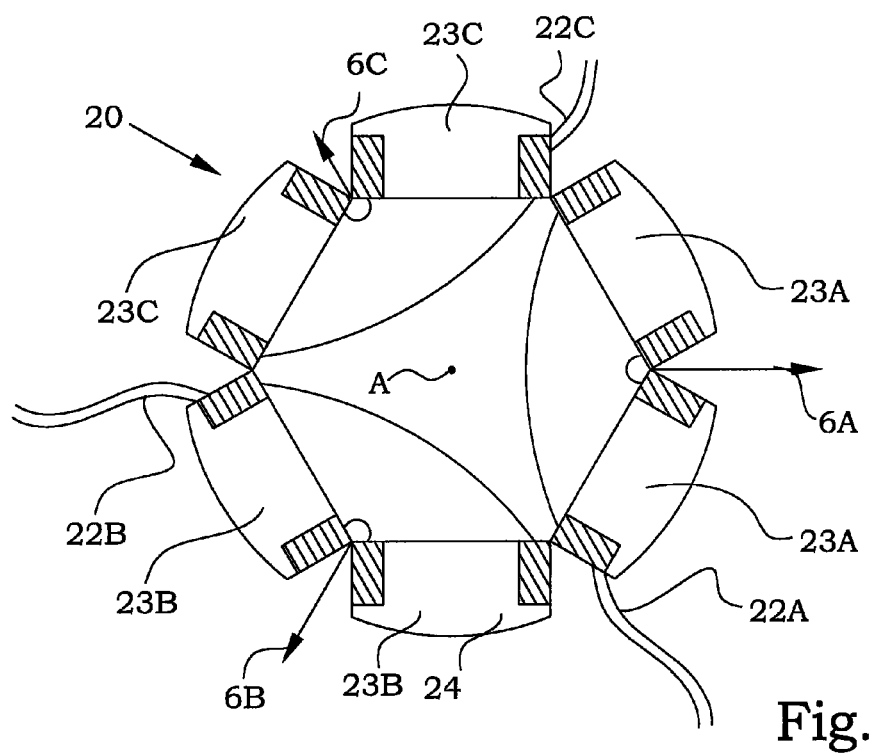
FIGS. 5A-5B are schematic views of embodiments of rotor winding solutions.

FIG. 5A illustrates an embodiment of a rotor 20 of an electrical machine with six rotor magnetic poles 24 and three individually controllable groups 23A-C of rotor magnetic poles. Each group has in this embodiment one single rotor winding 22A-C providing a bias magnetization as well as a controllable magnetization on top of the bias magnetization. In other words, the rotor magnetization control arrangement for such an embodiment is arranged for controlling the rotor currents superimposed on a basic magnetization current, common for all rotor windings. The basic magnetization current, or bias current is also "controllable". In case of a generator it is responsible for voltage regulation. There is also a coupling between this current and the force obtained when a current is varied on top. Such a design has the advantage of only needing one rotor winding for each rotor magnetic pole, which makes retrofitting easy.

Figure 5B:
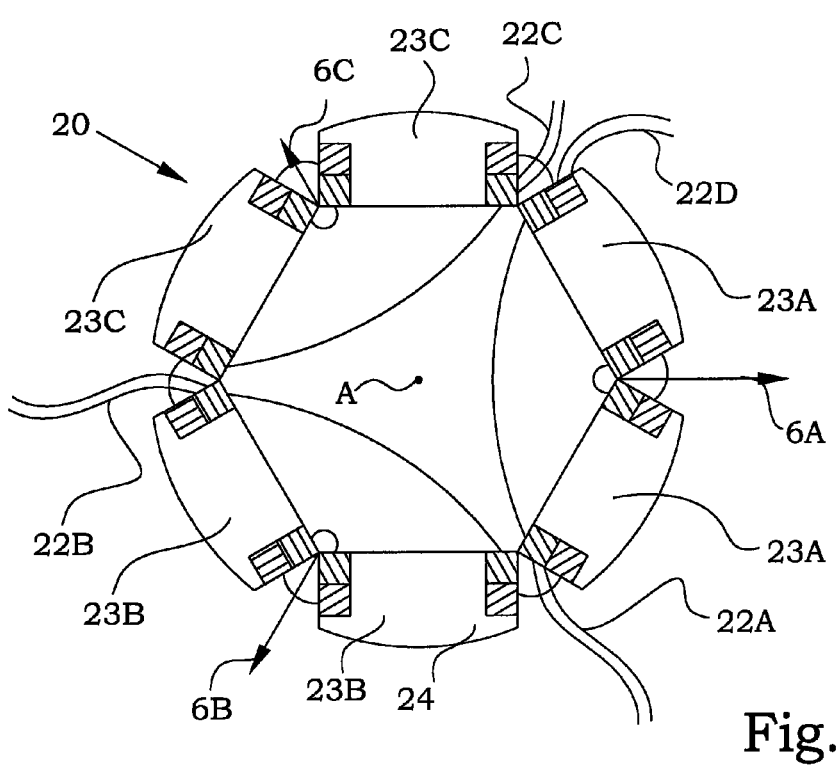

FIG. 5B illustrates another embodiment a rotor 20 of an electrical machine with six rotor magnetic poles 24 and three individually controllable groups 23A-C of rotor magnetic poles. One rotor winding 22D is here in common to all rotor magnetic poles, providing a bias magnetization. On top of this, additional individual rotor windings 22A-C are provided for the rotor magnetic poles for each of the groups. These windings provide rotor currents for modifying the magnetization to create the desired necessary radial forces. In other words, the rotor windings comprises, in addition to the individual group rotor windings, common rotor windings that are common to all rotor poles. The rotor power supply is consequently arranged to supply the common rotor windings by a basic magnetization current. An advantage with such a design is that the current that is controlled has a relatively low magnitude compared with the total current provided to each rotor magnetic pole. The reliability of such a system is also high.

Figure 6A:
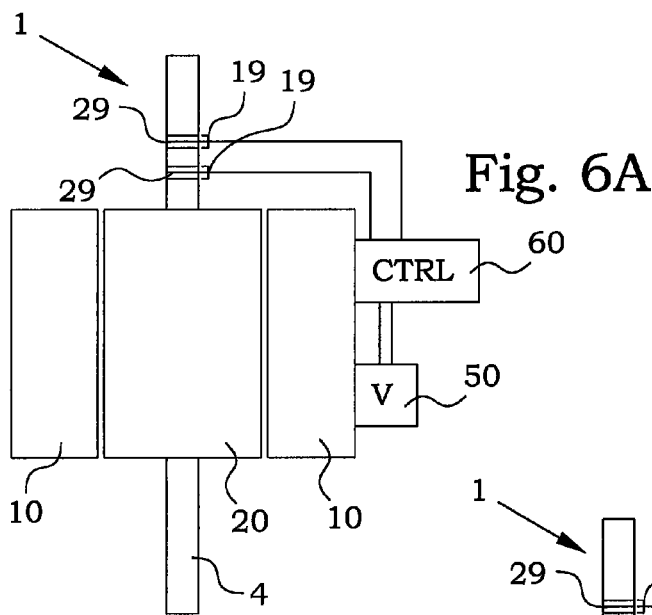
FIGS. 6A-6C are schematic views of embodiments of electrical machines with different positions of the rotor magnetization control arrangement.

The positioning of the rotor magnetization control arrangement can also be made in different ways. In FIG. 6A, a schematic side cross-sectional view of an embodiment of an electrical machine 1 is illustrated. The rotor magnetization control arrangement 60 is here provided at a stationary part of the electrical machine 1. Also the rotor power supply 50 is provided at the stationary side. The individually controlled rotor currents have to be transferred over to the rotating parts separately. Therefore, in this embodiment, the electrical machine 1 further comprises at least three brushes 19 and at least three slip rings 29 connecting the rotor windings to the rotor current control arrangement 60 for provision of the respective rotor currents. The number of brushes and slip rings depends on the rotor winding connection design. For example, in FIG. 6A, there are four pairs of brushes and slip rings.

Figure 6B:
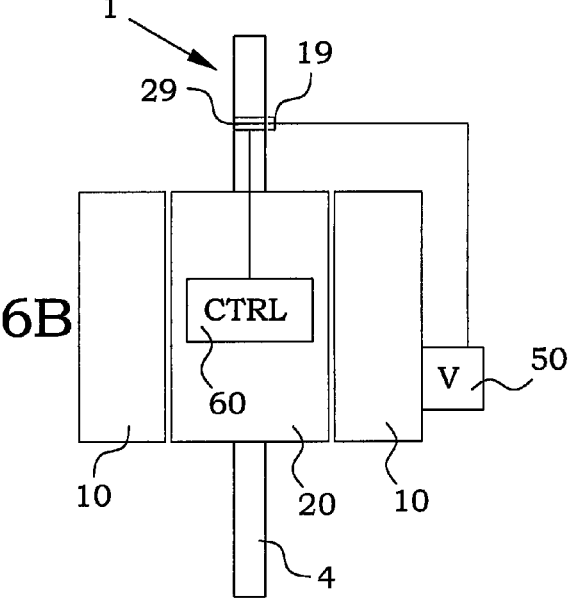

FIG. 6B illustrates a schematic side cross-sectional view of another, alternative, embodiment of an electrical machine 1. In this embodiment, the rotor magnetization control arrangement 60 is provided mechanically attached to said rotor. In a further alternative embodiment, the rotor magnetization control arrangement 60 may comprise one part provided at the rotor and one part at the stationary side. In this embodiment, the rotor power supply 50 is still provided at a stationary part of the electrical machine 1. The individually controlled rotor currents are controlled in the rotor magnetization control arrangement 60, but the supply of electrical energy from the rotor power supply 50 to the rotor magnetization control arrangement 60 has to be transferred from the stationary part of the electrical machine 1 to the rotor 20. Therefore, in this embodiment, the rotor magnetization control arrangement 60 is connected to the rotor power supply 50 by at least two brushes 19 and at least two slip rings 29.

Figure 6C:
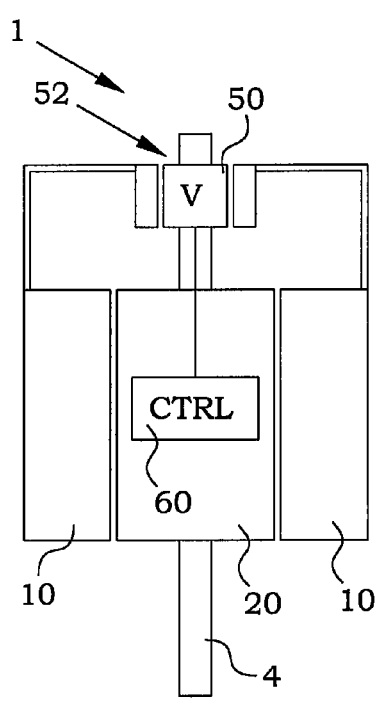

FIG. 6C illustrates a schematic side cross-sectional view of yet another, alternative, embodiment of an electrical machine 1. In this embodiment, the rotor magnetization control arrangement 60 is also provided, at least to a part, mechanically attached to the rotor 20. However, in this embodiment, the rotor power supply 50 comprises an excitation system 52 rotating together with the rotor 20. In such a way, the electric energy to be supplied to the groups of rotor magnetic poles is produced locally directly on the rotor, and any electric transferring system therefore becomes unnecessary.

Figure 7:
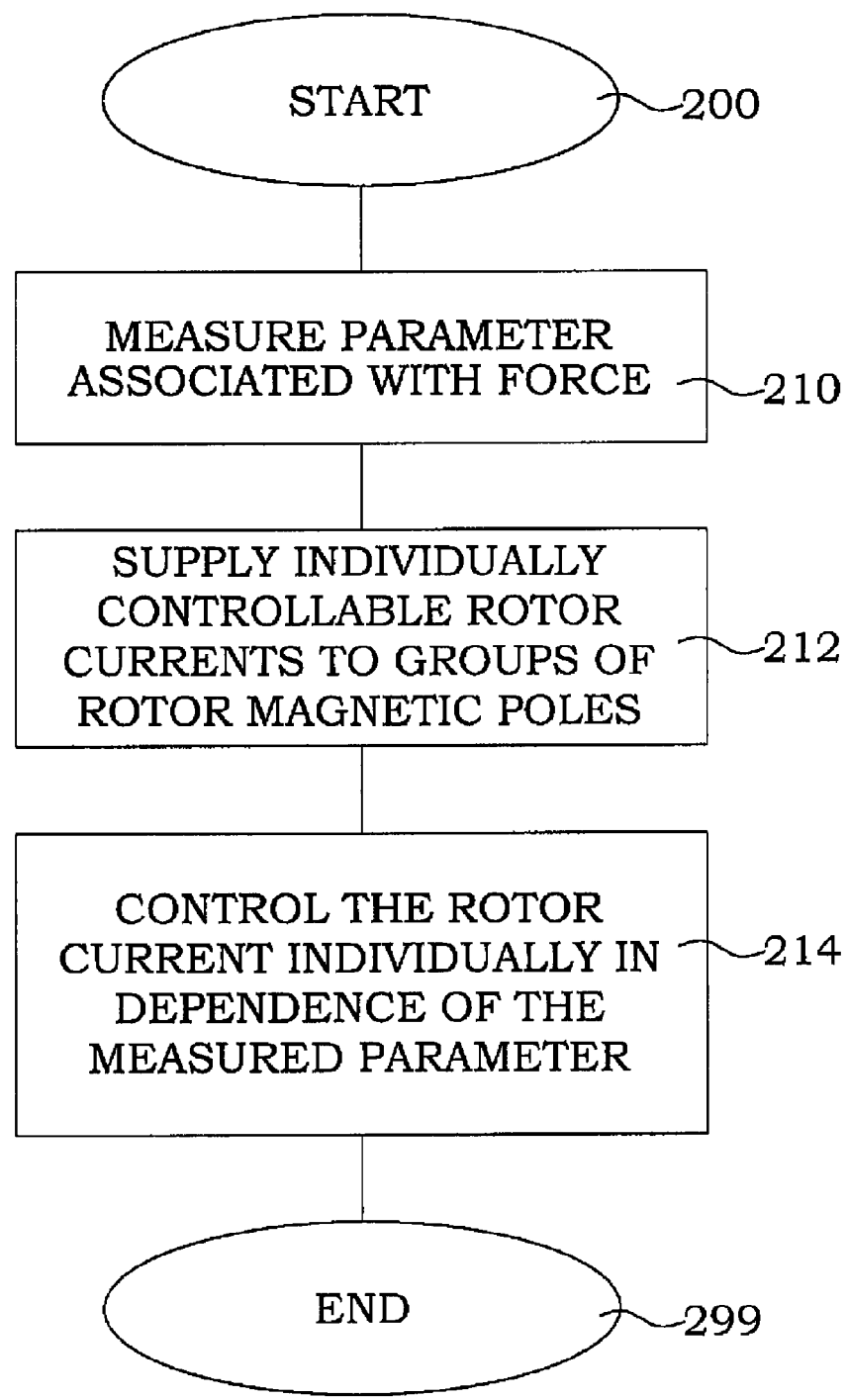
FIG. 7 is a flow diagram of steps of a method for controlling an electrical machine.

FIG. 7 is a flow diagram of steps of an embodiment of a method for controlling an electrical machine. The electrical machine has a stator and a rotor with rotor windings comprising rotor windings for controlling magnetization of rotor magnetic poles. The rotor magnetic poles are divided into at least two groups of rotor magnetic poles, where each group of rotor magnetic poles has at least one rotor magnetic pole. The process starts in step 200. In step 210, a parameter associated with a relative force between a part of the stator or a part mechanically attached to the stator and a part of the rotor or a part mechanically attached to the rotor is measured. In step 212, a respective individually controllable rotor current is supplied to the rotor windings of each of the at least two groups of rotor magnetic poles for controlling respective magnetic forces between the at least two groups of rotor magnetic poles and the stator. In step 214, the respective rotor currents are controlled individually in dependence of the measured parameter. The respective magnetic forces between the at least two groups of rotor magnetic poles and the stator contribute to a resulting net force between the part of the stator or the part mechanically attached to the stator and the part of the rotor or the part mechanically attached to the rotor. In a particular embodiment, the step 214 of controlling comprises controlling of the respective rotor currents individually in dependence of the measured parameter for directing the resulting net force towards a predetermined target force, larger than or equal to zero. The process ends in step 299.

In one embodiment, the step of controlling comprises controlling the respective rotor currents to reduce the resulting net force compared to a resulting net force without the respective rotor currents.

In one further embodiment, the step of controlling comprises controlling the respective rotor currents to minimize a time average of the resulting net force. The time average of the resulting net force corresponds to non-compensated forces caused by imperfections in the rotor or any part following the rotor in the rotating motion.

In another further embodiment, the step of controlling comprises controlling the respective rotor currents to minimize an instantaneous value of the resulting net force. The instantaneous value of the resulting net force corresponds to non-compensated forces caused by imperfections in the stator or any external part outside the rotor.

As mentioned before, one advantage of making force compensation by controlling rotor magnetic pole magnetization is that relatively low currents have to be used. This in turn means that less complex and less expensive power electronics may be used. The currents are typically small compared to the currents that are necessary to supply at the stator side to achieve the corresponding effect.

The described technology relates to an arrangement and method for force compensation in electrical machines. In prior art, the rotor magnetization equipment supplies a current to the rotor in order to provide the main magnetization of the rotor for it to act as an electrical machine. An unwanted effect can be large forces if the airgap flux density is asymmetric. The described technology can in one embodiment provide both the main magnetization (bias) current and the additional magnetization current to get a specific force applied to the rotor/stator configuration. The described technology thus enables the electrical machine to operate as usual with increased control capabilities.

Figure 8A:
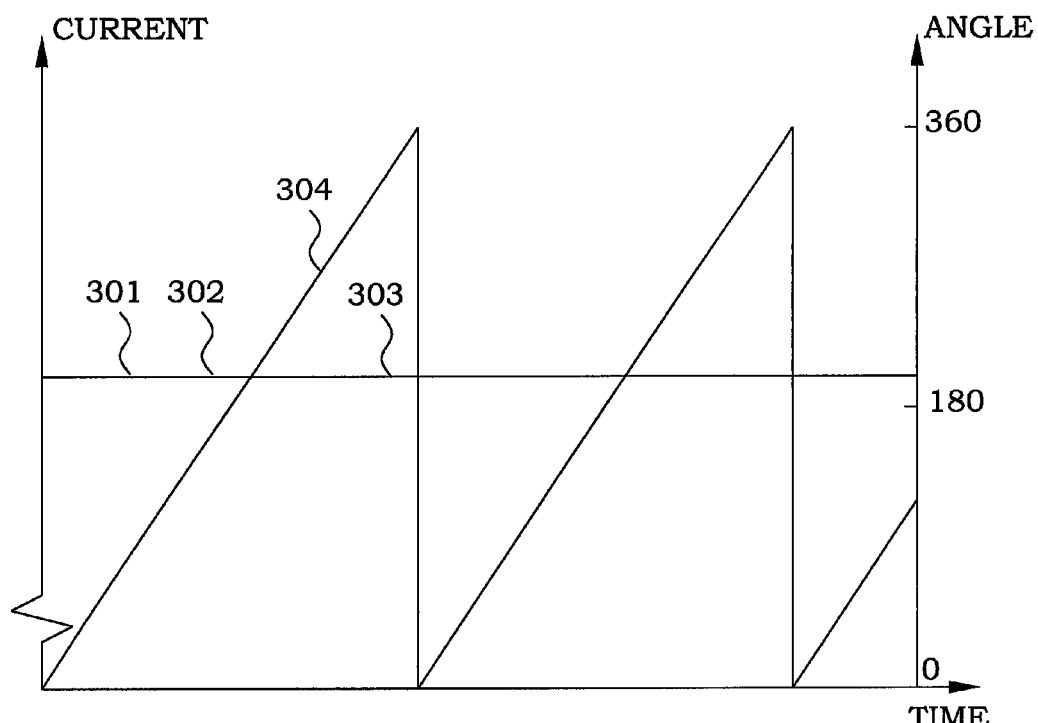
FIGS. 8A-8C are diagrams illustrating rotor currents.
Figure 9A:
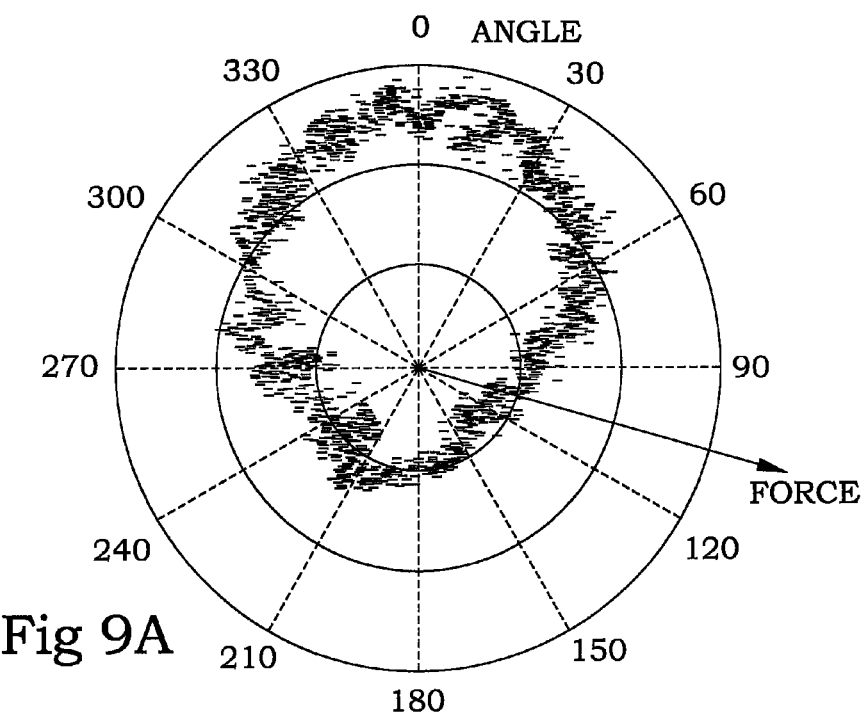
FIGS. 9A-9C are diagrams illustrating forces measured at a stator with the respective rotor currents of FIGS. 8A-8C applied.

The principles of the presented technology are tested on an electrical machine having three groups of rotor magnetic poles. Strain gauges at the stator side were used to measure strains, which were associated with forces between the rotor and the stator. In FIG. 8A, the applied rotor currents in the three groups are illustrated for a situation where no magnetization control at all is performed, other than setting the bias level to obtain a desired machine performance. All three rotor currents 301-303 are therefore equal to a common bias current and the total magnetic force between the rotor and stator is ideally zero. In reality, there is a resultant force between the rotor and stator due to their imperfections and the imperfections of the installation. Also the relative angle between the rotor and stator is also illustrated by the curve 304. A schematic illustration of the distribution of forces between the rotor and the stator for such a situation is depicted in FIG. 9A. Here it can be seen that the force varies with time, basically according to the rotational speed of the rotor and hence the relative angular position. However, the average force is also non-zero, which means that there are imperfections at the stator side and/or external forces.

Figure 8B:
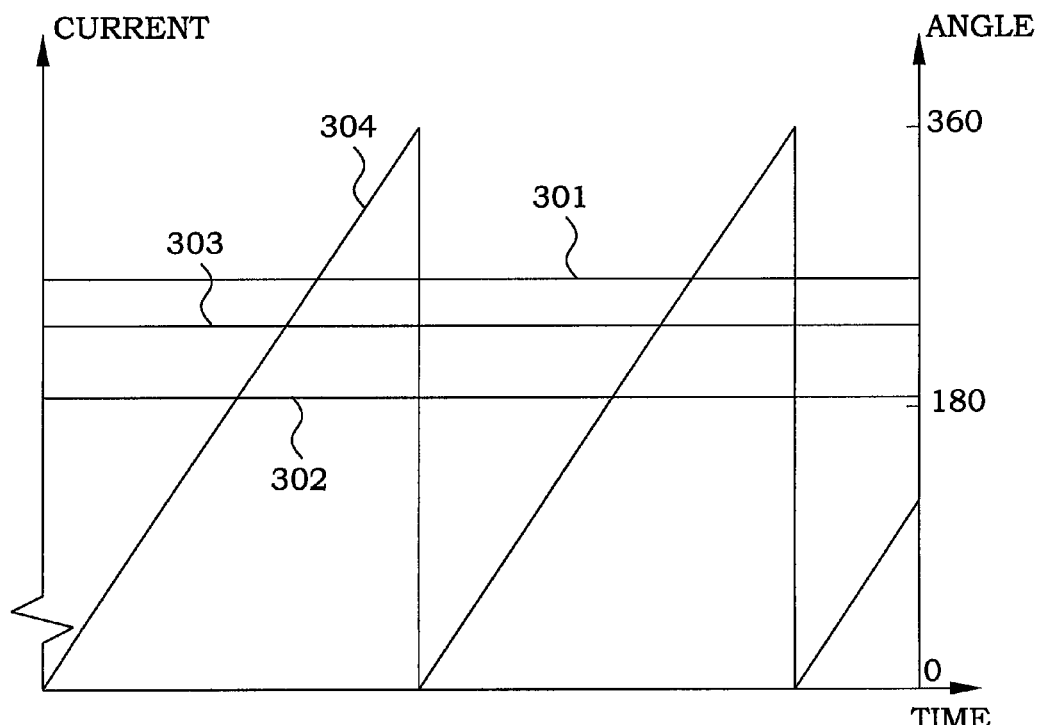
Figure 9B:
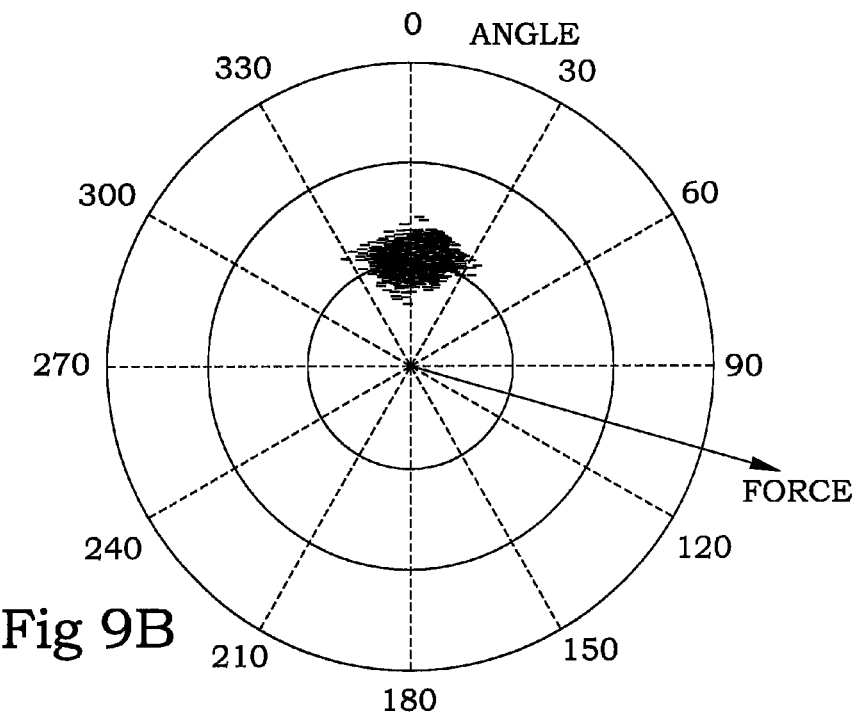

In FIG. 8B, the DC level of the rotor currents 301-303 have been adjusted individually for the three groups of rotor magnetic poles. This will compensate for imperfections in the rotating parts of the electric machine. The result is seen in FIG. 9B, where the resulting net force no longer has the pronounced time dependence according to the revolution time. However, the average force is still non-zero. The three groups of poles all have a bias current to provide the main magnetization of the electrical machine.

Figure 8C:
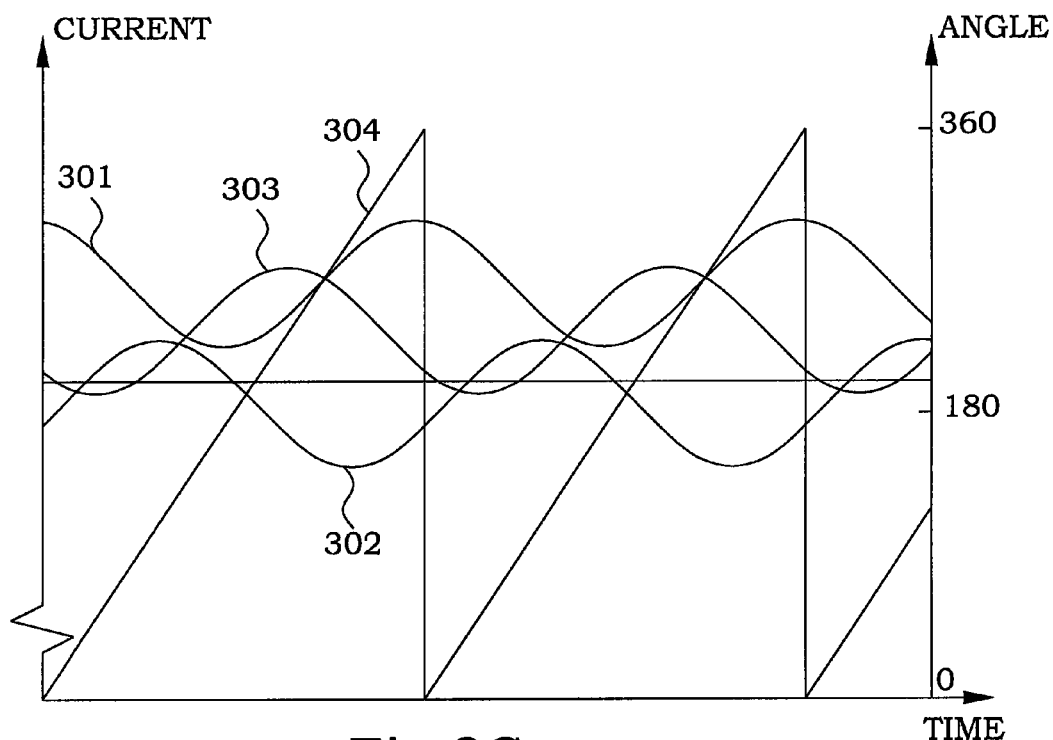
Figure 9C:
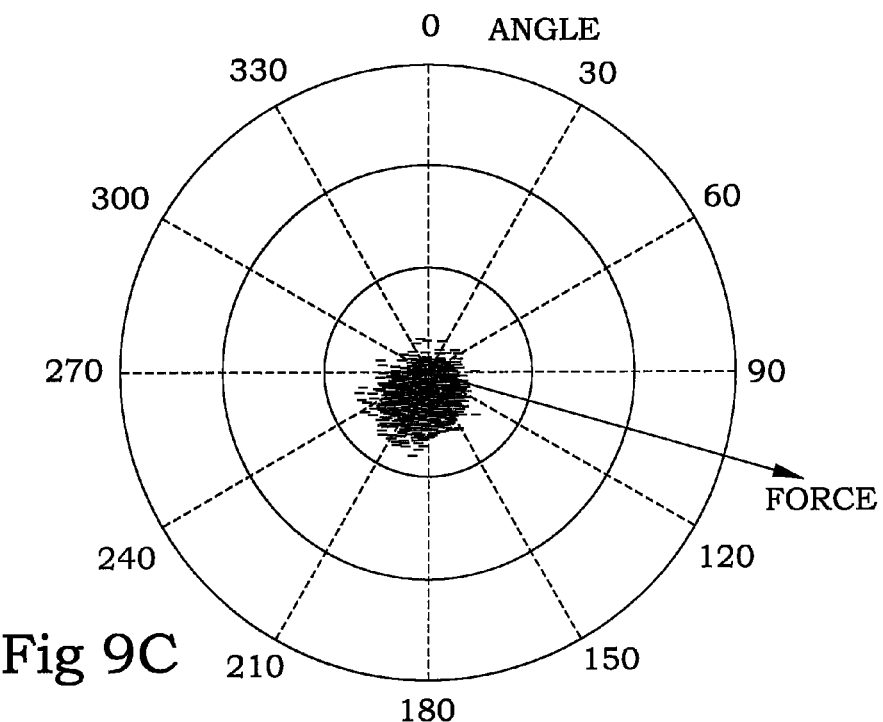

In FIG. 8C, also a time varying control of the rotor currents 301-303 has been applied. The time varying components will compensate for imperfections at the stationary side of the electrical machine. The result is illustrated in FIG. 9C, where it can be seen that the resulting net force is close to zero at all instances.

The control of the rotor currents is provided by use of standard controllable power electronics. The preferred detailed implementation depends on the actual design of the rotor windings, connections, the selected grouping of the rotor magnetic poles and the nature of the sensors. However, numerous strategies are available, as such, in prior art and any person skilled in the art of controllable power electronics can find a suitable setup.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An electrical machine, comprising:
   a rotor having rotor windings for controlling magnetization of rotor magnetic poles;
   a stator, provided around said rotor and arranged for allowing said rotor to rotate relative said stator; and
   a rotor power supply arranged to supply said rotor windings with current;
   at least one sensor, arranged to measure a parameter associated with a relative force between a part of said stator or a part mechanically attached to said stator and a part of said rotor or a part mechanically attached to said rotor; and
   a rotor magnetization control arrangement, communicationally connected to said at least one sensor for receiving a signal representing said measured parameter;
   said rotor magnetic poles being divided into at least two groups of rotor magnetic poles, each group of rotor magnetic poles having at least one rotor magnetic pole;
   said rotor magnetization control arrangement being arranged for controlling said magnetization of said at least two groups of rotor magnetic poles individually by providing a respective individually controllable rotor current from said rotor power supply to said rotor windings of each of said at least two groups of rotor magnetic poles;
   said rotor magnetization control arrangement being arranged to individually control said respective rotor currents in dependence of said signal representing said measured parameter of said at least one sensor.

2. The electrical machine according to claim 1, wherein said magnetization of said rotor magnetic poles causes a respective magnetic force between said rotor magnetic poles and said stator contribute to a resulting net force between said part of said stator or said part mechanically attached to said stator and said part of said rotor or said part mechanically attached to said rotor, wherein said rotor magnetization control arrangement being arranged for directing said resulting net force towards a predetermined target force, larger than or equal to zero.

3. The electrical machine according to claim 1, further comprising a rotor angular position indicator, communicationally connected to said rotor magnetization control arrangement, said rotor angular position indicator being arranged for determining a present angular position of said rotor with respect to said stator, whereby said rotor magnetization control arrangement being further arranged for receiving a signal from said rotor angular position indicator representing said present angular position and for individually controlling said respective rotor currents in further dependence of said signal representing said present angular position.

4. The electrical machine according to claim 1, wherein said rotor magnetization control arrangement is provided at a stationary part of said electrical machine and by further comprising at least three brushes and at least three slip rings connecting said rotor windings to said rotor magnetization control arrangement for provision of said respective rotor currents.

5. The electrical machine according to claim 1, wherein said rotor magnetization control arrangement, at least to a part, is provided mechanically attached to said rotor.

6. The electrical machine according to claim 5, wherein said rotor power supply is provided at a stationary part of said electrical machine;
   said rotor magnetization control arrangement is connected to said rotor power supply by at least two brushes and at least two slip rings.

7. The electrical machine according to claim 5, wherein said rotor power supply comprises an excitation system rotating with said rotor.

8. The electrical machine according to claim 1, wherein said rotor magnetization control arrangement is arranged to supply said respective rotor currents to give a magnetic force between said rotor magnetic poles and said stator that minimizes a resulting force.

9. The electrical machine according to claim 1, wherein said respective rotor currents are dc currents or time varying currents with a time constant larger than a revolution time of said rotor.

10. The electrical machine according to claim 1, wherein said respective rotor currents are time varying currents with a time constant smaller than a revolution time of said rotor.

11. The electrical machine according to claim 1, wherein said rotor windings further comprises common rotor windings that are common to all rotor magnetic poles, wherein said rotor power supply is further arranged to supply said common rotor windings by a basic magnetization current.

12. The electrical machine according to claim 1, wherein said rotor magnetization control arrangement being arranged for controlling said rotor currents superimposed on a basic magnetization current, common for all rotor windings.

13. The electrical machine according to claim 1, wherein said rotor magnetization control arrangement being arranged for controlling said rotor currents, giving additional individual rotor magnetizations, superposed on a basic permanent magnet magnetization.

14. The electrical machine according to claim 1, wherein said rotor magnetic poles being divided into three groups of rotor magnetic poles, whereby said respective rotor currents are provided to rotor windings corresponding to said three groups of rotor magnetic poles in a star circuit.

15. The electrical machine according to claim 1, wherein said rotor magnetic poles being divided into three groups of rotor magnetic poles, whereby said respective rotor currents are provided to rotor windings corresponding to said three groups of rotor magnetic poles in a delta circuit having no common ground.

16. A method for controlling an electrical machine having a rotor with rotor windings comprising rotor windings for controlling magnetization of rotor magnetic poles, said rotor magnetic poles being divided into at least two groups of rotor magnetic poles, each group of rotor magnetic poles having at least one rotor magnetic pole, and a stator, said method comprises the steps of:
   measuring a parameter associated with a relative force between a part of said stator or a part mechanically attached to said stator and a part of said rotor or a part mechanically attached to said rotor;
   supplying a respective individually controllable rotor current to said rotor windings of each of said at least two groups of rotor magnetic poles for controlling respective magnetic forces between said at least two groups of rotor magnetic poles and said stator; and
   controlling said respective rotor currents individually in dependence of said measured parameter.

17. The method according to claim 16, wherein said respective magnetic forces between said at least two groups of rotor magnetic poles and said stator contribute to a resulting net force between said part of said stator or said part mechanically attached to said stator and said part of said rotor or said part mechanically attached to said rotor, wherein said step of controlling comprises controlling said respective rotor currents individually in dependence of said measured parameter for directing said resulting net force towards a predetermined target force, larger than or equal to zero.

18. The method according to claim 17, wherein said step of controlling comprises controlling said respective rotor currents to reduce said resulting net force compared to a resulting net force without said respective rotor currents.

19. The method according to claim 18, wherein said step of controlling comprises controlling said respective rotor currents to minimize a time average of said resulting net force.

20. The method according to claim 18, wherein said step of controlling comprises controlling said respective rotor currents to minimize an instantaneous value of said resulting net force.

* * * * *

UNITED STATES PATENT AND TRADEMARK OFFICE
CERTIFICATE OF CORRECTION

PATENT NO. : 10,044,307 B2
APPLICATION NO. : 15/527240
DATED : August 7, 2018
INVENTOR(S) : Lundin et al.

Page 1 of 1

It is certified that error appears in the above-identified patent and that said Letters Patent is hereby corrected as shown below:

On the Title Page

Item "(30) Foreign Application Priority Data", change "1451374" to --1451374-1--

Signed and Sealed this
Twenty-sixth Day of February, 2019

Andrei Iancu
*Director of the United States Patent and Trademark Office*